US012208063B2

(12) United States Patent
Gallagher

(10) Patent No.: US 12,208,063 B2
(45) Date of Patent: Jan. 28, 2025

(54) NASOGASTRIC OR OROGASTRIC TUBE TIPS

(71) Applicant: Nasogastric Feeding Solutions Ltd., Liverpool (GB)

(72) Inventor: George Gallagher, Liverpool (GB)

(73) Assignee: Nasogastric Feeding Solutions Ltd., Liverpool (GB)

( * ) Notice: Subject to any disclaimer, the term of this patent is extended or adjusted under 35 U.S.C. 154(b) by 498 days.

(21) Appl. No.: 16/981,427

(22) PCT Filed: Feb. 15, 2019

(86) PCT No.: PCT/GB2019/050412
§ 371 (c)(1),
(2) Date: Sep. 16, 2020

(87) PCT Pub. No.: WO2019/158934
PCT Pub. Date: Aug. 22, 2019

(65) Prior Publication Data

US 2021/0244623 A1 Aug. 12, 2021

(30) Foreign Application Priority Data

Feb. 15, 2018 (GB) ..................................... 1802448

(51) Int. Cl.
*A61J 15/00* (2006.01)

(52) U.S. Cl.
CPC ....... *A61J 15/0003* (2013.01); *A61J 15/0026* (2013.01)

(58) Field of Classification Search
CPC ................ A61J 15/0003; A61J 15/0026; A61J 15/0096; A61M 25/007; A61M 1/84;
(Continued)

(56) References Cited

U.S. PATENT DOCUMENTS 2,116,083 A 5/1938 Rusch
5,360,414 A 11/1994 Yarger
(Continued)

FOREIGN PATENT DOCUMENTS

FR 2240026 A1 3/1975

OTHER PUBLICATIONS

Int'l Search Report for PCT/GB2019/050412, dated May 23, 2019.

*Primary Examiner* — Deanna K Hall
(74) *Attorney, Agent, or Firm* — MaxGoLaw PLLC

(57) ABSTRACT

An NG feeding tube tip (50) is disclosed, which has a main body portion that fits to the end of an NG or OG feeding tube (20). The main body has a hollow interior that is in fluid communication with the bore of the NG or OG tube (20); and an aperture (56) in a sidewall through which feed can be given to a patient, and through which a sample of stomach content can be aspirated. The tip (50) is characterised by the outer wall of the main body comprising a recess or groove (60, 62, 80), which intersects the aperture (56), and which extends at least partially around the exterior surface of the main body. The recess or groove (60, 62, 80) prevents or inhibits an aperture-occluding seal between the stomach wall (30) and the NG or OG tube tip being formed, especially when a vacuum is applied to the NG or OG tube (20) during an aspiration procedure.

13 Claims, 4 Drawing Sheets

(58) Field of Classification Search
CPC .......... A61M 25/0068; A61M 25/0067; A61M 25/0069; A61M 2025/0073
See application file for complete search history.

(56) References Cited

U.S. PATENT DOCUMENTS

| | | | | |
|---|---|---|---|---|
| 7,223,263 | B1 * | 5/2007 | Seno | A61M 25/007 604/537 |
| 2003/0154986 | A1 * | 8/2003 | Fariss | A61J 15/0096 128/207.14 |
| 2015/0051583 | A1 * | 2/2015 | Horvath | A61M 5/16804 604/523 |
| 2019/0201662 | A1 * | 7/2019 | Lad | A61L 29/085 |

* cited by examiner

NASOGASTRIC OR OROGASTRIC TUBE TIPS

This invention relates to improvements in and relating to nasogastric or orogastric tubes.

All references in this disclosure to nasogastric (NG) tubes are to be construed as also referring to orogastric (OG) tubes; and the term "NG" is merely shorthand herein for both types of tube and/or tip.

When feeding a patient using a nasogastric (NG), or an orogastric (OG) tube, it is necessary to pass a tube into the patient's stomach via their nose or mouth. In order to accomplish this, an NG tube is used, which comprises a flexible tube through which food is delivered, and which typically has a removable, internal support wire, which is withdrawn prior to feeding. The support wire temporarily increases the stiffness of the tube whilst it is being inserted, thus reducing the likelihood that the tube will curl back itself during insertion.

The tip of the NG or OG tube comprises a fairing-type device, known as an NG or OG tube tip. The tip has a rounded, bullet-shaped profile, which serves to assist the insertion of the tube into the patient's stomach, down his/her oesophagus. If the NG tube tip were not present, then the end of the feeding tube would otherwise present a blunt, square-tipped and, which would be likely to be trapped or snagged as it passes down into the stomach. Not only might this be uncomfortable for the patient, but it may also result in the feeding tube inadvertently curling back on itself, which is disadvantageous and could pose serious medical problems if feeding were to be commenced.

A typical NG tube tip, as previously mentioned, has a generally bullet-shaped exterior profile, which usually blends into the outer wall surface of the feeding tube itself. The NG tube tip can be over moulded into, or over, the distal end of the feeding tube, or it can comprise a spigot, which push-fits snugly into the open end of the feeding tube. Typically, the NG tube tip is secured in situ using adhesive or a weld so as to inhibit and/or prevent the NG tube tip from disconnecting from the end of the feeding tube itself-either during insertion, or during subsequent retraction.

Before feeding via an NG tube can commence, it is necessary to check the correct placement of the tube tip to ensure that it is correctly placed within the patient's stomach, rather than in the patient's lung. Due to the bifurcation of the patient's throat into the oesophagus and bronchi, it is possible, in certain cases, for the NG tube tip to be fed down into the lung, rather than into the stomach. If feeding is commenced whilst the NG tube is located in the patient's lung, this can lead to extremely serious medical consequences. As such, various test procedures have been implemented, which aim to ascertain the correct positioning of an NG tube tip prior to feeding.

One such NG tube tip placement verification technique involves taking an x-ray of the patient with the NG tube inserted. The x-ray will usually reveal the position of the NG tube in the patient's body, but the radiograph does require some considerable interpretation due to the overlapping of the stomach and lung of the patient, which can lead, in certain cases, to incorrect, or "false positive" results.

In addition to x-rays, which are generally contraindicated due to having to expose the patient to potentially harmful x-rays, it is commonplace for a sample to be aspirated up the NG tube before feeding commences. The rationale behind this is that if an acidic aspirate can be recovered from the patient, this usually indicates the location of the NG tube tip in an acidic liquid, namely stomach acid. Thus, the aspirate can be tested for its acidity, for example using pH or litmus paper, and if the aspirate is acidic, then this can indicate that the NG tube is correctly placed in the patient's stomach.

However, it is possible to obtain a "false positive" result if, for example, the patient has reflux, in which case, stomach acid may nevertheless be present in the lung. Whilst this is rare, further tests, such as testing for the presence of carbon dioxide (which is only present in exhaled air) and other stomach-specific markers (e.g. stomach-specific proteins) can be used in conjunction with a conventional pH test.

In order to obtain an aspirate, a syringe is typically affixed to the proximal end of the feeding tube, which syringe is withdrawn so as to create a vacuum within the feeding tube. This vacuum tends to draw aspirate back up the NG tube until eventually, a sample of aspirate fluid (usually a liquid) emerges at the proximal end of the feeding tube, which can be subsequently tested for whichever target substance the practitioner chooses. There has been much research and development, in recent years, in this regard and the present applicant's own earlier patent applications, namely GB2523591B, GB2523620A, GB2547012A and GB252842A, relate to various improvements and/or modifications to the ways that aspirates can be obtained and tested in this way.

It has been found, however, that in certain circumstances, it can be difficult to obtain an aspirate sample from the patient. In particular, if the patient has not eaten or drunk for some time, then the patient's stomach will generally be empty. An empty stomach of a human or animal patient typically collapses in on itself and so it is possible, in certain cases, that the walls of the stomach touch one another. If an NG tube is present in the stomach, it could effectively be trapped or clamped between opposing parts of the stomach wall and obtaining an aspirate sample will therefore be difficult.

Typically, the NG tube tip comprises one or more apertures, through which feed is delivered into the stomach via the feeding tube. The aperture or apertures in the NG tube tip are in fluid communication with the interior bore of the feeding tube and this provides a passageway for the passage of foods and liquids from a supply connected to the proximal end of the feeding tube into the patient's stomach, via the apertures at the distal end of the feeding tube. Normally, there is clear space around the apertures at the tip of the feeding tube, which enables this to happen, and which also enables an aspirate to be relatively easily obtained. Regardless, the positive pressure of feed being dispensed into the stomach tends to displace the stomach walls away from the NG tube tip apertures, thus removing any possible obstruction caused by the collapsed-in walls of an empty stomach around the NG tube tip.

However, if the patient has an empty and/or collapsed stomach, there will be very little liquid in the stomach for the practitioner to be able to obtain as a pre-feeding sample. Furthermore, if the stomach has collapsed in around the NG tube tip, it's possible, many cases, that the stomach walls will close-off the aperture or apertures at the tip of the NG tube. That situation is not helped by a vacuum being applied to the NG tube during an aspiration procedure, which tends to suck the stomach walls onto the NG tube tip, thus forming a better seal and thereby worsening the situation. If a seal is so formed, then it can be extremely difficult, if not impossible, to obtain an aspirate by applying a vacuum to the proximal end of the feeding tube.

A need therefore exists for a solution to this and/or other problem, which the present invention aims to provide.

Various aspects of the invention as set forth in the appended independent claim. Optional or preferred features of the invention are set forth in the appended dependent claims.

According to one aspect the invention, there is provided NG feeding tube tip comprising a main body portion having a hollow interior, which is, in use, in fluid communication with the bore of a feeding tube, the NG tube tip having a generally rounded outer profile, to facilitate guiding the feeding tube, in use, into the patient's stomach, and an aperture in a sidewall of the main body portion, which is in fluid communication with the hollow interior of the NG tube tip, and hence the bore of the feeding tube, the NG tube feeding tip being characterised in that the outer wall of the main body comprises a recess or groove, which intersects the aperture or apertures, and which extends at least partially around the exterior surface of the main body.

It will be appreciated that by providing a recess or groove, which is in fluid communication with the aperture in the NG tube tip, that if the NG tube tip's surface is in contact with the wall of the stomach, in use, then at least part of the groove or recess, which extends around the main body of the feeding tube tip, would likely not be in contact with a wall of the stomach. This configuration effectively "breaks the seal" between the stomach wall and the NG tube tip's aperture, thus ensuring that there is always a fluid pathway through which aspirate can be withdrawn through the feeding tube. In other words, because the recess or groove extends away from the aperture, provided at least part of the NG tube feeding tip is not in contact with the stomach wall, then it ought to be possible to obtain an aspirate sample by applying a vacuum to the proximal end of the feeding tube.

Suitably, the recess or groove extends radially at least part of the way around the circumference of the main body. Suitably, the recess or groove extends at least partially along an axial direction relative to the main body. In a preferred embodiment of the invention, the recess or groove is part helical, or at least extends both axially and radially around the main body of the NG tube tip.

In a yet further preferred embodiment, the NG tube tip comprises two or more recesses or grooves, which provide a plurality of fluid passageways between various points on the NG tip's main body's surface and the aperture, in fluid communication with the interior volume of the NG tube tip. By providing a plurality of fluid passageways, which preferably extend in different directions, the likelihood of a seal being formed between the NG tube tip and a stomach wall is considerably reduced.

It will be appreciated, by the skilled reader, that in order to insert the feeding tube into the patient of the stomach, the NG tube tip should have a smooth, rounded profile. However, by recessing or by providing grooves in the outer surface of the NG tube tip, as in the invention, this might be deemed to increase the chances of the NG tube tip snagging against the oesophagus or stomach wall during insertion and/or retraction. In order to ameliorate against this, the recess or grooves preferably have a profile, which does not present an edge or surface at 90° to the to the longitudinal axis of the main body. In other words, by inclining the surfaces and/or edges of the recesses or grooves, it is possible to obtain the benefits of the invention, whilst reducing, or avoiding, the downside of increasing the "drag" of the feeding tube during insertion and/or retraction.

Preferred embodiments of the invention shall be described, by way of example only, with reference to the accompanying drawings, in which.

Figure 1:
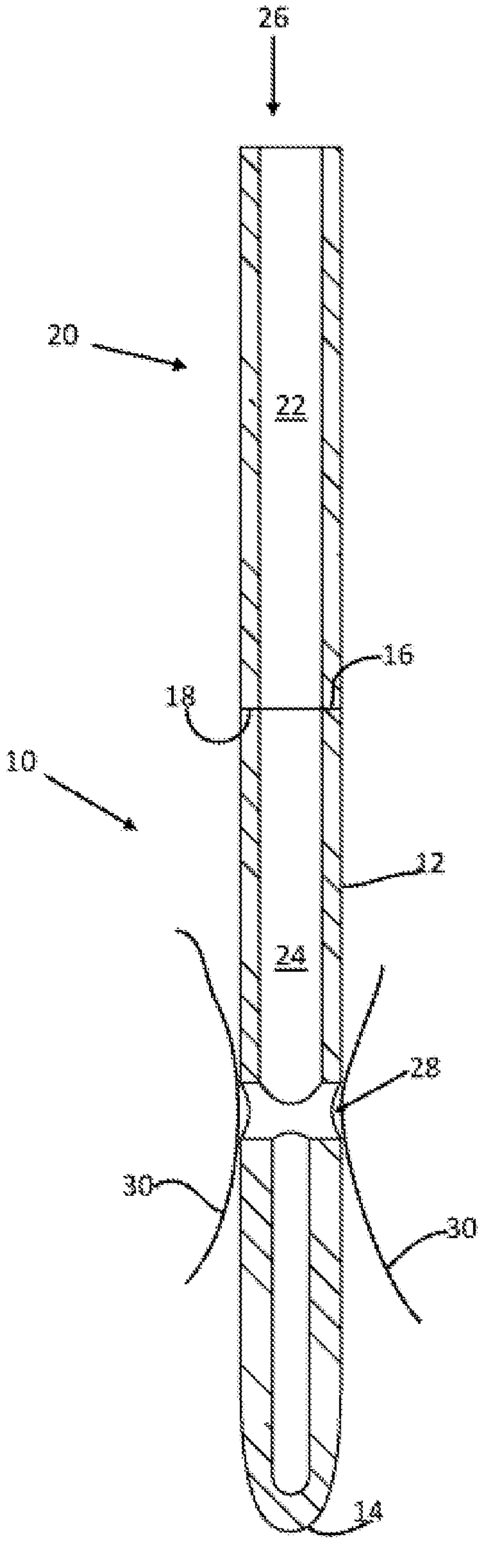
FIGURE 1 PRIOR ART
FIGS. 1 and 2 are, respectively, sectional and side views of a known NG tube tip.
Figure 2:
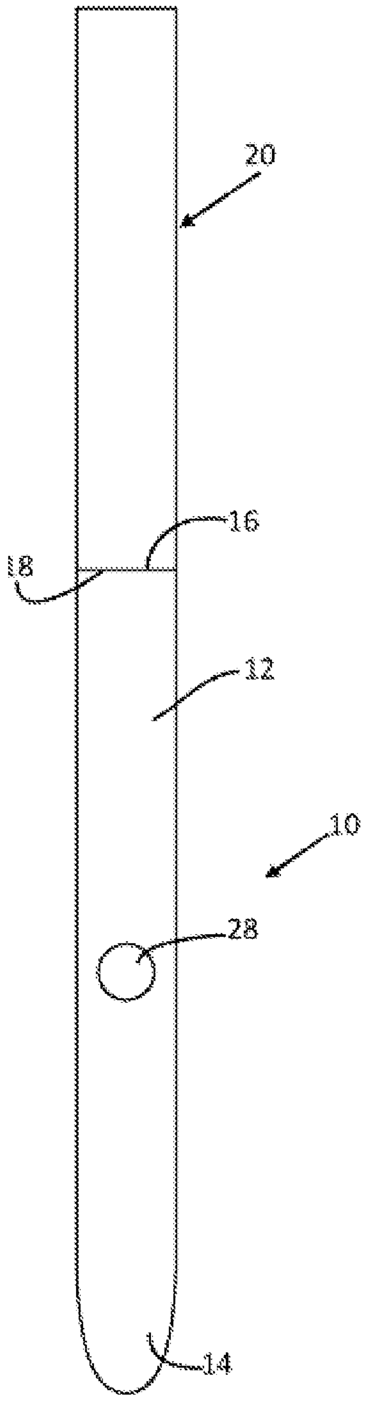
FIGURE 2 PRIOR ART

A known NG tube tip 10 is shown in FIGS. 1 and 2 of the accompanying drawings.

The NG tube tip 10 is manufactured from a small piece of injection-moulded plastics, which has a smooth outer surface 12 and a bullet-shaped, rounded tip 14. The NG tube tip has a trailing edge 16, which is butt-welded onto the leading edge 18 of an NG tube 20. The NG tube 20 has a hollow interior bore 22 which extends axially along its entire length and the NG tube tip 10 also has an interior bore 24, which is in fluid communication with the bore 22 of the NG tube 20. A fluid passageway therefore exists between the proximal end 26 of the NG tube 20 and the interior bore 24 of the NG tube tip 10. Fluids can thus be passed into and out of the NG tube tip 10 via the feeding tube 20 and open proximal end 26 as will be well understood by those skilled in the art.

The NG tube tip 10 also has a through aperture 28, which extends all the way through the main body of the NG tube tip 10 and which is in fluid communication with the bore 24 of the NG tube tip. Accordingly, fluids can be delivered to, or withdrawn from, a patient via a pressure or vacuum, respectively, applied at the open proximal end 26 of the NG tube 20.

As shown schematically in FIG. 1 of the drawings, if the patient has an empty stomach, then the side walls 30 of the stomach can collapse in on themselves and can thus seal-off the through aperture 28 thereby preventing fluids from being aspirated or delivered to the patient via the NG tube 20 and tip 10. It will be appreciated, from FIG. 1, that if a vacuum is applied at the open proximal end 26 of the NG tube 20, that this will simply suck the stomach walls 30 further into engagement with the through bore 28, thus sealing off the opening 28 and thus preventing an aspiration procedure from proceeding.

A solution to this problem is proposed by various embodiments of the invention, which are described hereinbelow:

Referring now to FIGS. 3, 4, 5 and 6 of the drawings, an NG tube tip 50 in accordance with the invention is affixed to the end of an NG tube 20 in the manner previously described. The NG tube tip 50 of the invention has a generally cylindrical main body 52 whose profile blends into the outer profile of the NG tube 20—thereby forming a smooth transition between the two. The distal end 54 of the NG tube tip 50 is rounded, i.e. bullet-shaped thus facilitating insertion of the NG tube 20 into the patient's stomach, in use. The NG tube tip 50 of the invention also has a through aperture 56, which functions in the same manner as the through aperture 28 of the known NG tube tip previously described.

Where the invention differs from the known NG tube tip 10 is in the configuration of the outer profile 52 of the NG tube tip itself, and in particular in the vicinity of the through aperture 56.

As can be seen from FIGS. 3 to 6 of the drawings, the outer surface 58 of the NG tube tip 50 has a set of recesses 60, 62 cut into it. There is a generally axial recess 60, which runs generally parallel to the longitudinal axis of the NG tube tip 50 and which has one end that intersects the through aperture 56. This provides a fluid passageway between regions along the length of the axial recess 60 and the through aperture 56 of the NG tube tip. Extending radially around the NG tube tip 50 are also a set of radial grooves 62 and each of these intersects the axial recess 60.

This essentially forms a grid-like array of modules defined by the axial 60 and radial 62 recesses. The modules serve to separate the stomach wall 30 from the aperture 56. The edges and vertices of the nodules are rounded or radiused, so as to provide for smooth sliding of the tip 50 in use, and reduce snagging.

Figure 3:
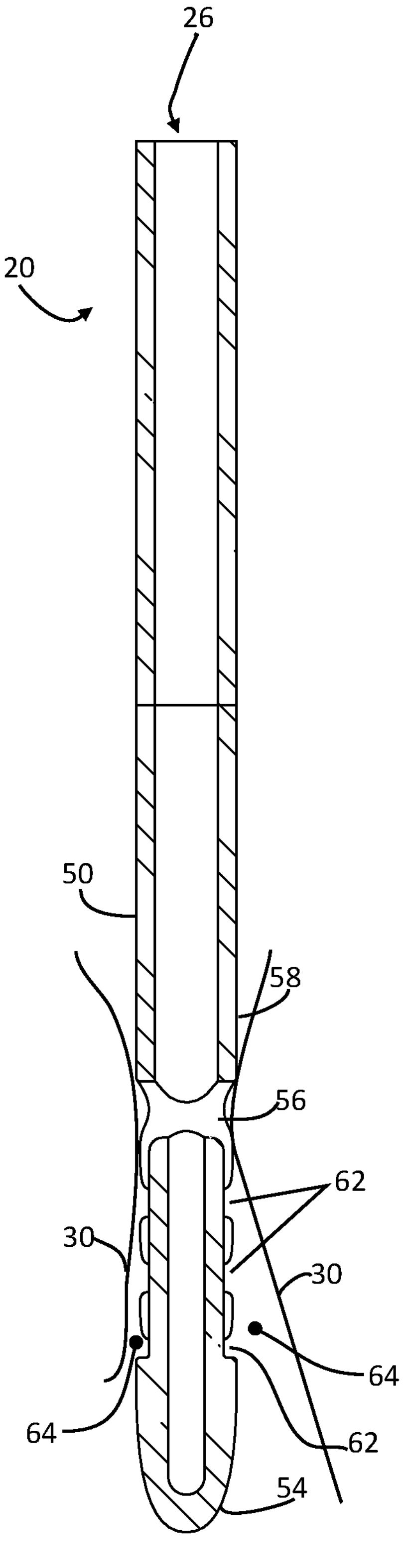
FIGS. 3 and 4 are, respectively, sectional and side views of an NG tube tip in accordance with the invention.
Figure 4:
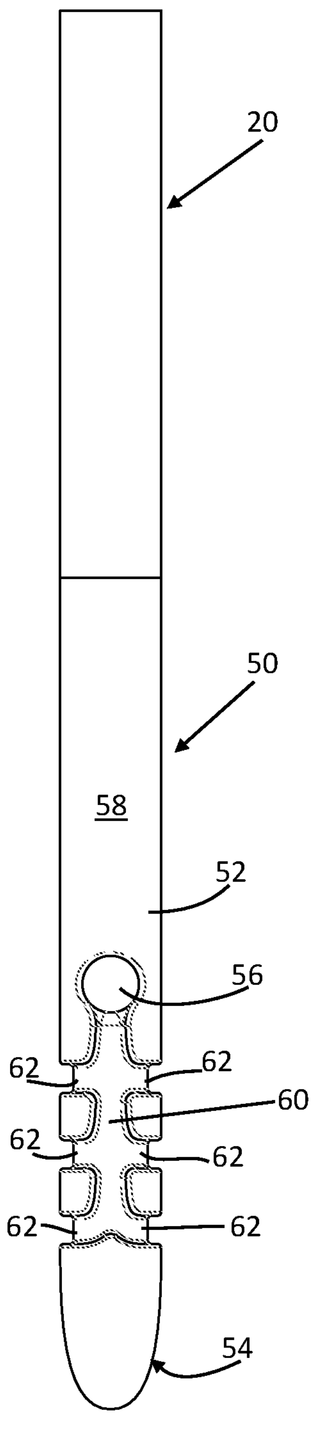
Figure 6:
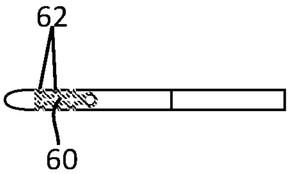
FIG. 6 is the NG tube tip of FIG. 4 at actual size.
Figure 5:
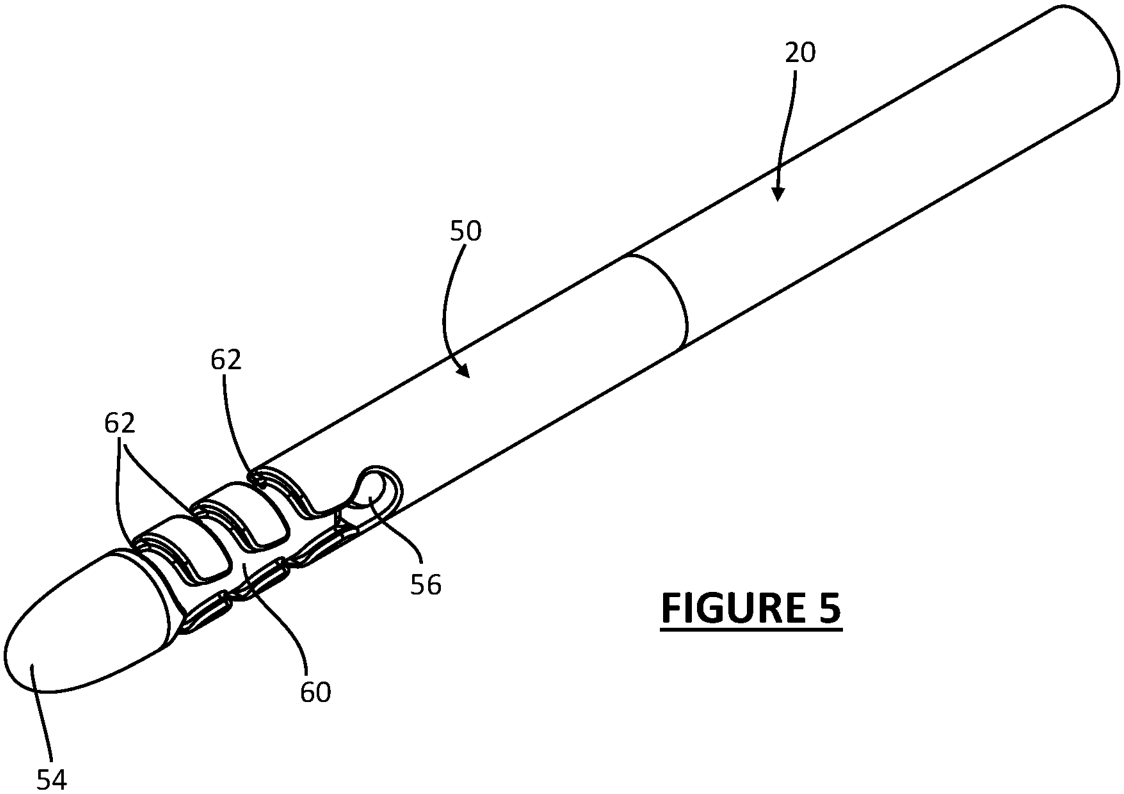
FIG. 5 is a perspective view of the NG tube tip shown in FIG. 4.

Now, as can be seen with reference to FIG. 3 of the drawings, if the walls 30 of a patient's stomach come into contact with the through aperture 56, thereby sealing it in the manner previously described with reference to FIGS. 1 and 2, the NG tube tip still can function in both aspirate and in feed-delivery modes of operation. The reason for this is that because whilst the through aperture 56 itself may be sealed off by the stomach walls 30, there will inevitably be some region 64, which is not in contact with the stomach wall 30. Due to the configuration of the axial and radial grooves, 60, 62, a vacuum applied to the proximal end 26 of the feeding tube 20 will still enable a fluid to be aspirated from the non-contacting region 64, despite the fact that the through aperture itself 56 may be closed-off by the stomach wall 30.

In other words, the grooves and recesses extending away from the through aperture 56 provide clear passageways through which fluid can be aspirated from the stomach even if the stomach wall 30 is effectively sealing some part of the NG tube tip off. It is unlikely, in most cases, that the entirety of the NG tube tip 50 would be completely in contact with a stomach wall 30 and thus the invention enables feeding and/or aspiration to take place notwithstanding the configuration of the stomach wall 30. This represents a significant improvement over known NG tube tips and also addresses one or more of the problems outlined previously.

Figure 7:
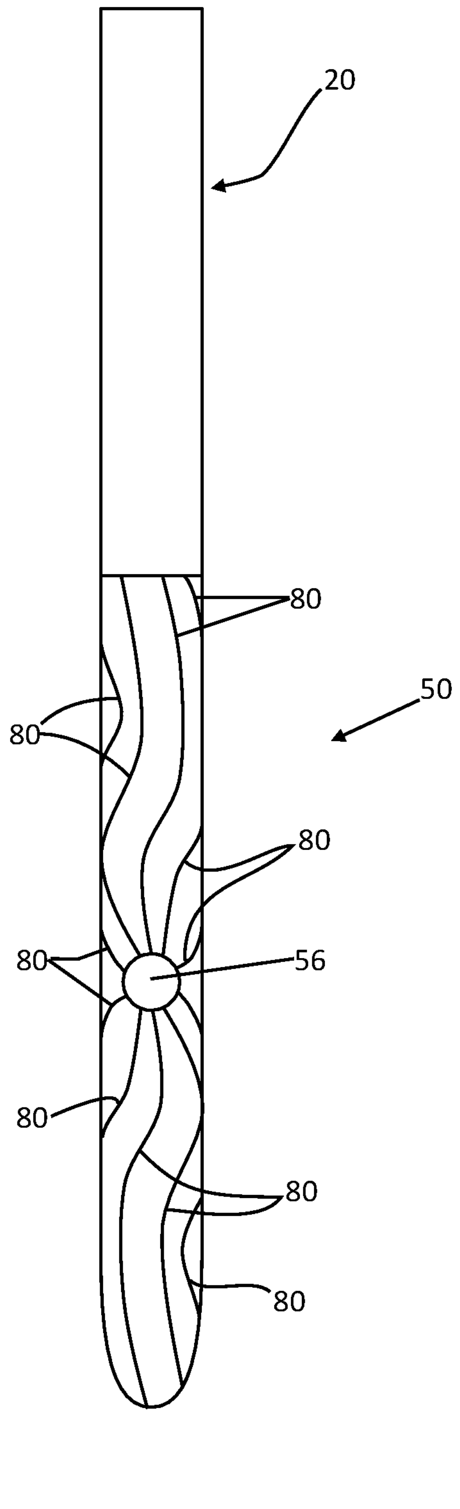
FIG. 7 is a side view of an alternative embodiment of an NG tube tip in accordance with the invention.
Figure 8:
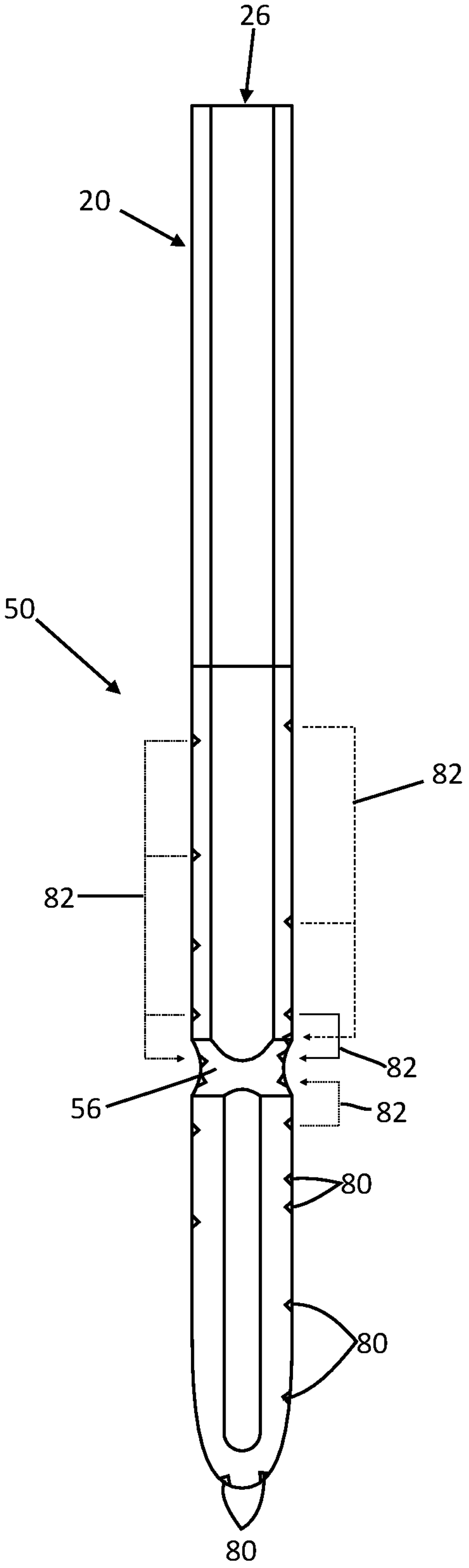
FIG. 8 is a sectional view of FIG. 7.

Referring now to FIGS. 7 and 8 of the drawings, an alternative embodiment of an NG tube tip 50 in accordance with the invention is shown. Identical reference signs have been used to identify identical features to avoid repetition herein. The main difference between the embodiment shown in FIGS. 7 and 8 of the drawings and that shown in FIGS. 3 to 6 of the drawings is the configuration of the grooves 80, which are formed as small capillaries extending in a serpentine fashion away from the through aperture 56, rather than being a regular/geometric arrangement as in the previously-described embodiment.

The main advantage of providing capillary grooves 80, rather than larger features as in the previous embodiment is that even very small amounts of liquid can effectively "wick", via capillary action, into the through bore 56 thereby reducing the reliance on a vacuum needing to be applied at the proximal end 26 of the feeding tube 20. Furthermore, because the capillary grooves 80 are very small, they will present much lower friction/resistance during insertion/retraction of the feeding tube 20 and this may be beneficial in certain cases.

The configuration of the capillary grooves can be of any type, although it is anticipated that serpentine, or helical capillary configurations would be preferred because they enable liquid from various different points around the surface of the NG tube tip to be drawn by vacuum or wicked into the through aperture 56—thereby reducing the directionality of the NG tube tip 50. In FIG. 8 of the drawings, it can be seen how each of the capillary grooves 80 provides an effective fluid passageway between various points on the surface of the NG tube tip 50 and the through opening aperture 56. These passageways are indicated, schematically, by the arrows 82 in FIG. 8.

The invention claimed is:

1. An orogastric or nasogastric (NG) feeding tube tip comprising:

a main body portion having a hollow interior bore, which is, in use, in fluid communication with a bore of a feeding tube; and only one through aperture in a sidewall of the main body portion, which is in fluid communication with the hollow interior bore, and hence the bore of the feeding tube, the NG tube feeding tip being characterised in that:

an outer wall of the main body portion comprises a recess or groove on the outer wall and sized to provide capillary draw action to wick fluids, the recess or groove, intersects the one through aperture, and which extends at least partially around an exterior surface of the main body portion, and in that the one through aperture extends perpendicularly to an axis of the hollow interior bore, the capillary draw action being independent of external vacuum draw applied to the one through aperture;

the only one through aperture extends entirely through the main body portion, where diametrically opposing openings of the one through aperture in the sidewall are equidistant from a distal end of the NG tube feeding tip; and is in fluid communication with the hollow interior bore.

2. The NG feeding tube tip of claim 1, wherein the recess or groove extends radially at least partially around a circumference of the main body portion.

3. The NG feeding tube tip of claim 1, wherein the recess or groove extends at least partially along an axial direction relative to the main body portion.

4. The NG feeding tube tip of claim 1, wherein the recess or groove extends both axially and radially around the main body portion of the NG feeding tube tip.

5. The NG feeding tube tip of claim 1, wherein the recess or groove follows a serpentine path around the main body portion of the NG feeding tube tip.

6. The NG feeding tube tip of claim 1, wherein the recess or groove follows an at least partially helical path around the main body portion of the NG feeding tube tip.

7. The NG feeding tube tip of claim 1, wherein the recess or groove comprises two or more recesses or grooves, which provide a plurality of fluid passageways between various points on the NG feeding tube tip's main body portion's surface and the only one through aperture.

8. The NG feeding tube tip of claim 7, wherein the two or more recesses or grooves extend in different directions.

9. The NG feeding tube tip of claim 1, wherein the NG feeding tube tip comprises a smooth, rounded profile.

10. The NG feeding tube tip of claim 1, wherein the NG feeding tube tip comprises a generally bullet-shaped, rounded tip.

11. The NG feeding tube tip of claim 1, wherein the recess or groove comprises a profile, which does not present an edge or surface at 90° to a longitudinal axis.

12. The NG feeding tube tip of claim 1, wherein surfaces and/or edges of the recess or groove are inclined.

13. The NG feeding tube tip of claim 1, wherein the main body portion is generally cylindrical and has a profile, which blends into an outer profile of the feeding tube to which the NG feeding tube tip is affixed.

* * * * *